US010532687B2

(12) United States Patent
Moorman (10) Patent No.: US 10,532,687 B2
(45) Date of Patent: Jan. 14, 2020

(54) QUICK-MOUNTING ACCESSORY FOR A TRUCK (71) Applicant: Buyers Products Company, Mentor, OH (US)

(72) Inventor: Scott Moorman, Concord Township, OH (US)

(73) Assignee: Buyers Products Company, Mentor, OH (US)

( * ) Notice: Subject to any disclaimer, the term of this patent is extended or adjusted under 35 U.S.C. 154(b) by 102 days.

(21) Appl. No.: 15/601,259

(22) Filed: May 22, 2017

(65) Prior Publication Data

US 2017/0253162 A1 Sep. 7, 2017

Related U.S. Application Data (62) Division of application No. 14/618,183, filed on Feb. 10, 2015, now Pat. No. 9,656,586.

(60) Provisional application No. 61/938,076, filed on Feb. 10, 2014.

(51) Int. Cl.
| *B60P 1/04* | (2006.01) |
| *B60P 1/28* | (2006.01) |
| *B60P 1/273* | (2006.01) |
| *B60P 1/26* | (2006.01) |
| *B60P 1/16* | (2006.01) |

(52) U.S. Cl.
CPC ........ *B60P 1/04* (2013.01); *B60P 1/16* (2013.01); *B60P 1/26* (2013.01); *B60P 1/273* (2013.01); *B60P 1/283* (2013.01); *B60P 1/286* (2013.01)

(58) Field of Classification Search
CPC ...... B60P 1/04; B60P 1/28; B60P 1/16; B60P 1/26; B60P 1/273; B60P 1/283; B60P 1/286

USPC ........ 298/1 A, 17 T, 17 R, 22 R; 296/26.11, 296/26.08, 50–53, 55, 57.1, 59, 60, 39.2

See application file for complete search history.

(56) References Cited

U.S. PATENT DOCUMENTS

| 3,471,045 A | * | 10/1969 | Panciocco | B60P 1/32 298/1 A |
| 4,572,579 A | | 2/1986 | Saito | |
| 4,909,558 A | * | 3/1990 | Roshinsky | B60R 13/01 296/37.6 |
| 5,447,361 A | | 9/1995 | Phillips | |
| 6,196,634 B1 | * | 3/2001 | Jurinek | B60P 1/16 298/1 A |
| 6,340,190 B1 | | 1/2002 | Rosebrugh | |
| 7,114,784 B1 | | 10/2006 | Blumenstein et al. | |
| 7,399,038 B2 | * | 7/2008 | Vandewinckel | B62D 33/02 298/1 A |

(Continued)

FOREIGN PATENT DOCUMENTS

CA 2862167 7/2013

OTHER PUBLICATIONS

U.S. Appl. No. 14/618,183, filed Feb. 10, 2015.

*Primary Examiner* — Stephen T Gordon
(74) *Attorney, Agent, or Firm* — Renner, Otto, Boisselle & Sklar, LLP (57) ABSTRACT

A cargo bay accessory for inserting into a cargo bay of a truck, the cargo bay accessory having opposing stepped side walls forming horizontal support surfaces at different elevations, wherein the support surfaces on one side are at the same elevation as the support surfaces on the opposite side, and wherein the lower support surfaces are laterally spaced closer together than higher support surfaces.

10 Claims, 5 Drawing Sheets

(56) References Cited

U.S. PATENT DOCUMENTS 9,656,586 B2 * 5/2017 Moorman .................. B60P 1/28
2002/0140247 A1 * 10/2002 Emery .................... B60R 13/01
296/39.1

* cited by examiner

QUICK-MOUNTING ACCESSORY FOR A TRUCK

This application is a divisional of U.S. patent application Ser. No. 14/618,183 filed Feb. 10, 2015, which claims priority to U.S. Provisional Application No. 61/938,076 filed Feb. 10, 2014, all of which are hereby incorporated herein by reference in their entirety.

FIELD OF INVENTION

The present invention relates generally to truck accessories, and more particularly to an apparatus and method for quickly mounting an accessory in the cargo bay of a truck.

BACKGROUND

A standard pickup truck cargo bay has many uses, and a variety of accessories are made to fit within a truck's cargo bay. Some common accessories include, extended liners, extended cabs, liquid storage tanks, cold storage units or reefers, large batteries, and more. Many of these accessories have no means for properly securing the accessory to the bed of the truck, while other accessories require near-permanent attachment to the truck cargo bay, making installation and removal difficult if not impossible.

One example of an accessory that may benefit greatly from quick mounting is a dump insert. A variety of industries, such as construction, landscaping, timber, debris and waste removal, snow removal and shipping, require use of dump trucks to effectively load, haul and unload material. Dump trucks are large and expensive, and often not practical for smaller businesses in need of less carrying capacity.

In light of the need for a smaller and less expensive dump mechanism, several companies have produced so-called dump inserts. A dump insert is an apparatus that can be mounted into the cargo bay of pickup truck to provide dumping capabilities to a standard pickup truck. Since many small business owners in industries such as landscaping and construction already own pickup trucks for hauling, a dump insert provides an inexpensive method of adding dump capabilities.

Current dump inserts, however, are difficult to install and remove. For example, the majority of dump inserts require bolting a frame of the dump insert to the bed of the truck in several places. The dump inserts typically also must be connected to the truck's power system, further complicating installation and removal. As a result, business owners must effectively choose between permanently converting a truck to allow dumping or frequently performing long and complicated installation and removal procedures.

SUMMARY OF INVENTION

The present invention provides an apparatus and method for quickly mounting an accessory in the cargo bay of a truck. The invention includes quick-mount locking members that utilize the existing tailgate pivot members of a pickup truck with the tailgate removed, allowing for quicker and easier installation and removal of an accessory in the cargo bay of a truck. An exemplary application is disclosed wherein the accessory is a dump insert.

According to an aspect of the invention, a quick-mounting device for mounting an accessory apparatus in a cargo bay of a truck, the cargo bay having right and left tailgate pivot members protruding inwardly from left and right side walls of the cargo bay for mounting a tailgate, includes a mounting structure for mounting the device to the accessory apparatus and a locking member mounted to the mounting structure for movement relative to the mounting structure between a locking position for engaging one of the right or left tailgate pivot members to hold the mounting structure to the tailgate pivot members, and a release position for disengaging the tailgate pivot members to allow removal of the mounting structure from the tailgate pivot members.

According to an embodiment of the device, the locking members each include a locking tube mounted to the mounting structure for lateral extension and retraction, the locking tube forming a socket for receiving therein the respective tailgate pivot member when laterally extended for securing the mounting structure to the cargo bay and to clear the respective tailgate pivot member when laterally retracted, thereby to allow removal of the mounting structure from the cargo bay.

According to another embodiment of the device, the locking tube is laterally guided in a locking bracket that is adjustably mounted to the mounting structure for vertical adjustment with respect to the mounting structure.

According to a further embodiment of the device, the locking tube has in opposed side walls aligned holes for receiving a locking pin perpendicular to the axis of the locking tube.

According to yet another embodiment of the device, the mounting structure has a recess in which the locking bracket is laterally restrained but movable vertically in the recess, and the locking tube and locking bracket are fixed against movement relative to the mounting structure by engaging the locking pin.

According to one more embodiment of the device the locking bracket includes a plurality of detents connected by a void, the detents positioned to receive the locking pin when placed through the side walls of the locking tube, wherein the pin may be positioned in a second detent by rotating the locking tube in a first direction to move the pin out of a first detent and into the void, laterally moving the locking tube to position the pin over the second detent, and rotating the locking tube in second direction opposite to the first direction to position the screw in the second detent.

According to another aspect of the invention, an accessory apparatus for mounting in a cargo bay of a truck, the cargo bay having right and left tailgate pivot members protruding inwardly from left and right side walls of the cargo bay for mounting a tailgate, includes a frame configured to fit in the cargo bay between left and right side walls, the frame having a front end, a back end, and right and left sides and right and left locking members mounted to the frame for movement between a locking position engaging the tailgate pivot members for holding the frame in the cargo bay and a release position separated from the tailgate pivot members for allowing removal of the frame from the cargo bay.

According to an embodiment of the apparatus, the right and left locking members are mounted to back end of the frame through a mounting bar.

According to another embodiment of the apparatus, the right and left locking members comprise right and left locking tubes mounted to the frame for lateral extension and retraction, the right and left locking tubes being coaxially aligned and each configured to receive therein a respective tailgate pivot member when laterally extended for securing the frame in the cargo bay and to clear the respective tailgate pivot member when laterally retracted, thereby to allow removal of the frame from the cargo bay.

According to a further embodiment of the apparatus, the right and left locking tubes are further adjustably mounted to the frame for vertical positioning with respect to the frame.

According to yet another embodiment of the apparatus, the right and left locking tubes each include a receiving hole at one lateral end for receiving a tailgate pivot member and a locking hole for receiving a screw perpendicular to the rotational axis of the tube, wherein the locking tube is locked by tightening a screw placed in the locking hole.

According to one more embodiment of the apparatus, right and left brackets are attached, respectively, to the right and left side of the front end of the frame, extending upward from the frame.

According to another embodiment of the apparatus a cross member is attached between the right and left brackets above the frame.

According to a further embodiment of the apparatus, at least one strap is included, wherein for each strap a first end of the strap is fastened to a first attachment point of the cargo bay, a middle portion of the strap is positioned over the cross member, and a second end of the strap is fastened to a second attachment point of the cargo bay.

According to yet another embodiment of the apparatus, a telescoping bar is supported by the right and left brackets.

According to one more embodiment of the apparatus, at least one strap is included, wherein for each strap a first end of the strap is fastened to a first attachment point of the cargo bay, a middle portion of the strap is positioned over the telescoping bar, and a second end of the strap is fastened to a second attachment point of the cargo bay.

According to another embodiment of the apparatus at least one wheel is attached to a bottom portion of each of the right and left brackets.

According to an embodiment of the apparatus, a cargo bay liner is mounted to the frame.

According to another embodiment of the apparatus, the cargo bay liner is double-walled and has an inner wall spaced from an outer wall.

According to a further embodiment of the apparatus, the cargo bay liner includes opposing stepped side walls forming horizontal support surfaces at different elevations, wherein the support surfaces on one side are at the same elevation as the support surfaces on the opposite side, and wherein the lower support surfaces are laterally spaced closer together than higher support surfaces.

According to yet another embodiment of the apparatus, the cargo bay liner includes a detachable tailgate section, pivotally connectable both at top edges of a back end of the cargo bay liner and at bottom edges of the back end of the cargo bay liner between right and left sides of the cargo bay liner.

According to one more embodiment of the apparatus, wall extension sections are mountable to a top edge of left or right sides of the cargo bay liner, extending upward from a respective side of the cargo bay liner when mounted.

According to another embodiment of the apparatus, a rear window guard section is mountable to a top edge of a front section of the cargo bay liner, the rear window guard section extending upward from the front section of the cargo bay liner when mounted, and the rear window guard section includes a plurality of holes for allowing sight through the rear window guard section.

According to a further embodiment of the apparatus, the cargo bay liner is pivotally mounted to the back end of the frame.

According to yet another embodiment of the apparatus, the cargo bay liner is attached to a mechanical arm, the mechanical arm being extendably attached to a middle portion of the frame.

According to one more embodiment of the apparatus, a hydraulic drive system for extending or retracting the mechanical arm is included.

According to another embodiment of the apparatus, the frame includes a housing capable of holding a battery.

According to a further embodiment of the apparatus, the hydraulic drive system is powered by a battery housed in the housing of the frame.

According to another aspect of the invention, a method of mounting an accessory apparatus in a cargo bay of a truck from which a tailgate has been removed to expose right and left tailgate pivot members that protrude inwardly from side walls of the cargo bay, includes placing a frame of the accessory in the cargo bay with a front end located forward in the cargo bay and a back end located rearward in the cargo bay, positioning the frame in the cargo bay to align right and left locking tubes of the frame with the right and left tailgate pivot members, and laterally extending the right and left locking tubes laterally outwardly into engagement with the tailgate pivot members for securing the accessory in the cargo bay.

According to another aspect of the invention, a dumping insert for mounting in a cargo bay of a truck, the cargo bay having right and left tailgate pivot members protruding inwardly from left and right side walls of the cargo bay for mounting a tailgate, includes a frame configured to fit in the cargo bay between left and right side walls, the frame having a back end and an upper support structure that is pivotally connected to a lower support structure at the back end of the frame, wherein the lower support structure has right and left quick-mounting devices, at the back end of the frame, for movement between a locking position engaging the tailgate pivot members for holding the frame in the cargo bay and a release position separated from the tailgate pivot members for allowing removal of the frame from the cargo bay, and a dump body connected to the upper support structure of the frame.

According to an embodiment of the dumping insert, the right and left quick-mounting devices include a mounting structure for mounting the device to the accessory apparatus and a locking member mounted to the mounting structure for movement relative to the mounting structure between a locking position for engaging one of the right or left tailgate pivot members to hold the mounting structure to the tailgate pivot members, and a release position for disengaging the tailgate pivot members to allow removal of the mounting structure from the tailgate pivot members.

According to another embodiment of the dumping insert, the locking members each comprise a locking tube mounted to the mounting structure for lateral extension and retraction, the locking tube forming a socket for receiving therein the respective tailgate pivot member when laterally extended for securing the mounting structure to the cargo bay and to clear the respective tailgate pivot member when laterally retracted, thereby to allow removal of the mounting structure from the cargo bay.

According to a further embodiment of the dumping insert, the locking tube is laterally guided in a locking bracket that is adjustably mounted to the mounting structure for vertical adjustment with respect to the mounting structure.

According to yet another embodiment of the dumping insert, the locking tube has in opposed side walls aligned holes for receiving a locking pin perpendicular to the axis of the locking tube.

According to one more embodiment of the dumping insert, the mounting structure has a recess in which the locking bracket is laterally restrained but movable vertically in the recess, and the locking tube and locking bracket are fixed against movement relative to the mounting structure by engaging the locking pin.

According to another embodiment of the dumping insert, the locking bracket includes a plurality of detents connected by a void, the detents positioned to receive the locking pin when placed through the side walls of the locking tube, wherein the pin may be positioned in a second detent by rotating the locking tube in a first direction to move the pin out of a first detent and into the void, laterally moving the locking tube to position the pin over the second detent, and rotating the locking tube in second direction opposite to the first direction to position the screw in the second detent.

According to a further embodiment of the dumping insert, right and left brackets are attached, respectively, to right and left sides of the front end of the lower support structure, extending upward from the frame.

According to yet another embodiment of the dumping insert, a cross member is attached between the right and left brackets above the frame.

According to one more embodiment of the dumping insert, at least one strap is included, wherein for each strap a first end of the strap is fastened to a first attachment point of the cargo bay, a middle portion of the strap is positioned over the cross member, and a second end of the strap is fastened to a second attachment point of the cargo bay.

According to another embodiment of the dumping insert, a telescoping bar is supported by the right and left brackets.

According to a further embodiment of the dumping insert, at least one strap is included, wherein for each strap a first end of the strap is fastened to a first attachment point of the cargo bay, a middle portion of the strap is positioned over the telescoping bar, and a second end of the strap is fastened to a second attachment point of the cargo bay.

According to yet another embodiment of the dumping insert, at least one wheel is attached to a bottom portion of each of the right and left brackets.

According to one more embodiment of the dumping insert, the dump body is double-walled and has an inner wall spaced from an outer wall.

According to another embodiment of the dumping insert, the dump body includes opposing stepped side walls forming horizontal support surfaces at different elevations, wherein the support surfaces on one side are at the same elevation as the support surfaces on the opposite side, and wherein the lower support surfaces are laterally spaced closer together than higher support surfaces.

According to a further embodiment of the dumping insert, a detachable tailgate section is pivotally connectable both at top edges of a back end of the dump body and at bottom edges of the back end of the dump body between right and left sides of the dump body.

According to yet another embodiment of the dumping insert, wall extension sections are mountable to a top edge of left or right sides of the dump body and extending upward from the respective side of the dump body when mounted.

According to one more embodiment of the dumping insert, a rear window guard section is mountable to a top edge of a front section of the dump body, the rear window guard section extending upward from the front section of the dump body when mounted, wherein the rear window guard section comprises a plurality of holes for allowing sight through the rear window guard section.

According to another embodiment of the dumping insert, the dump body is further attached to a mechanical arm, the mechanical arm being extendably attached between middle portions of the lower and upper support structures of the frame.

According to a further embodiment of the dumping insert, a hydraulic drive system for extending or retracting the mechanical arm is included.

According to yet another embodiment of the dumping insert, the frame includes a housing capable of holding a battery.

According to an embodiment of the dumping insert, the hydraulic drive system is powered by a battery housed in the housing of the frame.

According to another aspect of the invention, a method of mounting a dumping insert in a cargo bay of a truck from which a tailgate has been removed to expose right and left tailgate pivot members that protrude inwardly from side walls of the cargo bay, includes placing the dumping insert in the cargo bay with a front end located forward in the cargo bay and a back end located rearward in the cargo bay, positioning dumping insert in the cargo bay to align right and left locking tubes of the dumping insert with the right and left tailgate pivot members, and laterally extending the right and left locking tubes laterally outwardly into engagement with the tailgate pivot members for securing the dumping insert in the cargo bay.

According to an embodiment of the method, the method includes placing a strap over a cross member at the front end of the dumping insert, fastening a first end of the strap to a first attachment point located forward in the cargo bay, and fastening a second end of the strap to a second attachment point located forwarded in the cargo bay.

According to a further embodiment of the method, wherein the cross member is a telescoping bar, the method includes extending the telescoping bar laterally to create a friction between ends of the telescoping bar and the left and right side walls of the cargo bay.

According to another aspect of the invention, a cargo bay accessory for inserting into a cargo bay of a truck includes opposing stepped side walls forming horizontal support surfaces at different elevations, wherein the support surfaces on one side are at the same elevation as the support surfaces on the opposite side, and wherein the lower support surfaces are laterally spaced closer together than higher support surfaces.

According to an embodiment of the cargo bay accessory, the cargo bay accessory is double-walled and has an inner wall spaced from an outer wall.

According to another embodiment of the cargo bay accessory, a detachable tailgate section is pivotally connectable both at top edges of a back end of the cargo bay accessory and at bottom edges of the back end of the cargo bay accessory between right and left sides of the cargo bay accessory.

According to a further embodiment of the cargo bay accessory, wall extension sections are mountable to a top edge of left or right sides of the cargo bay accessory, extending upward from the respective side of the cargo bay accessory when mounted.

According to yet another embodiment of the cargo bay accessory, a rear window guard section is mountable to a top edge of a front section of the cargo bay accessory, the rear window guard section extending upward from the front section of the cargo bay accessory when mounted, wherein the rear window guard section comprises a plurality of holes for allowing sight through the rear window guard section.

DETAILED DESCRIPTION

Figure 1:
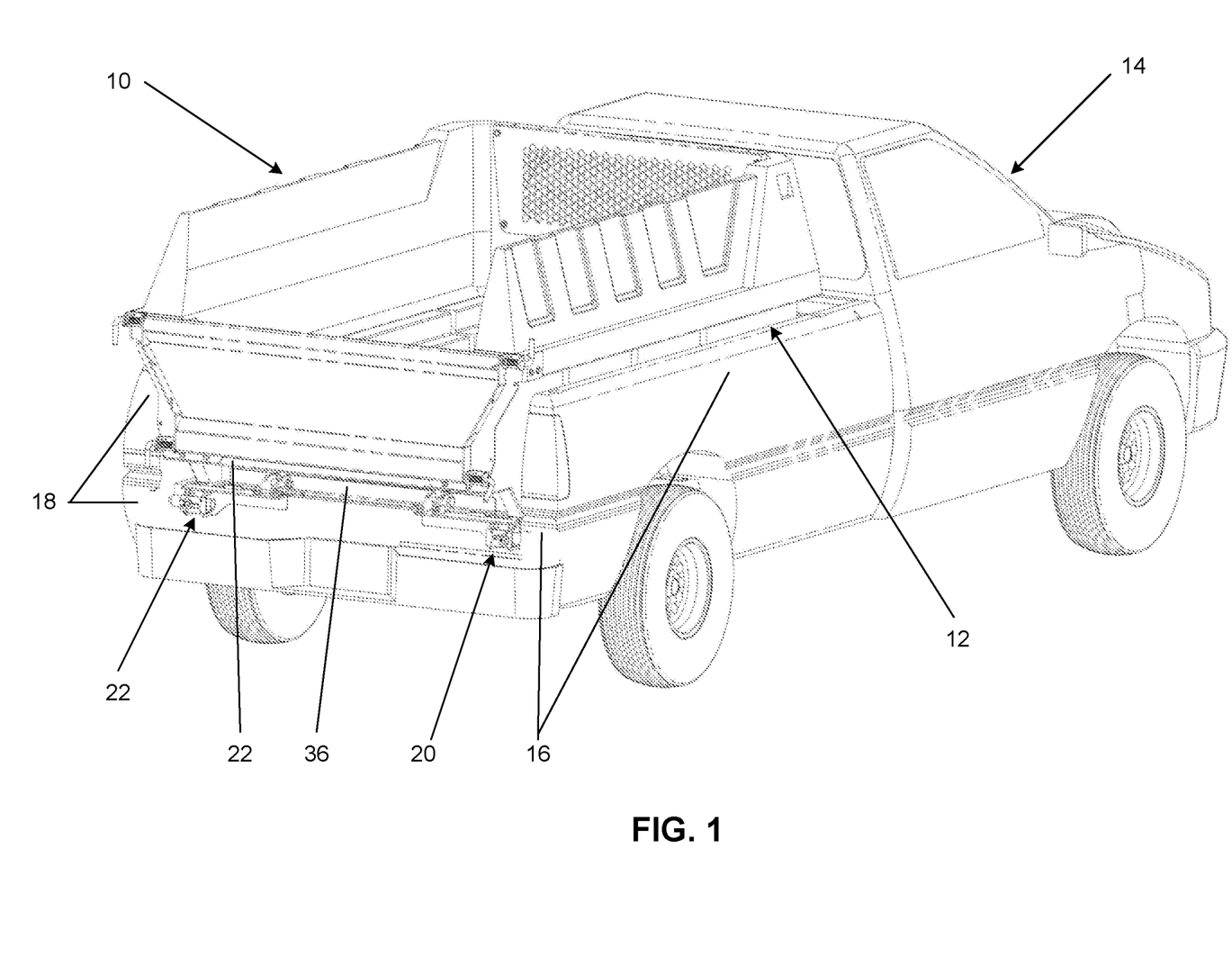
FIG. 1 is a perspective view of a truck with an exemplary dump insert accessory mounted in its cargo bay according to an embodiment of the present invention.

Turning first to FIG. 1, illustrated is an exemplary embodiment of an accessory apparatus wherein the accessory apparatus is dump insert 10. The dump insert 10 is mounted to the cargo bay 12 of truck 14. The cargo bay 12 has right and left sidewalls 16 and 18 that each have tailgate pivot members protruding inwardly from left and right side walls 16 and 18 of the cargo bay 12 for mounting a tailgate. The dump insert 10 is mounted to the tailgate pivot members of sidewalls 16 and 18 via right and left quick-mounting devices 20 and 22.

Figure 2:
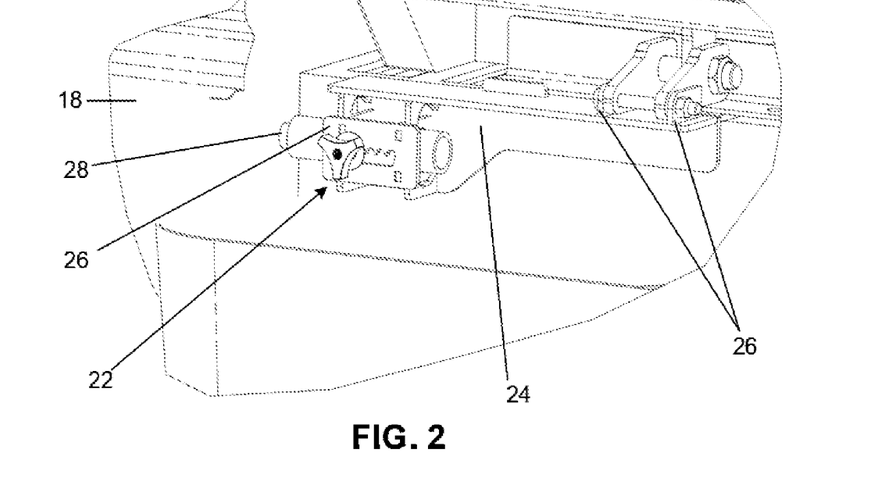
FIG. 2 is a broken-out view of a mounting apparatus according to the present invention when engaged for mounted in the cargo bay of a truck.

Turning now to FIG. 2, illustrated is a close-up view of the left quick-mounting device 22. It should be noted that respective right quick-mounting device 20 may include all the same features herein described for this embodiment of the quick-mounting device 22, and visa versa.

The left quick-mounting device 22 has a mounting structure 24 for mounting the device to an accessory apparatus, such as dump insert 10. In the exemplary illustration, the mounting structure 24 has mounting brackets 26 for attaching the mounting structure to the accessory apparatus. The quick-mounting device described herein may also be integrally formed as part of an accessory apparatus or a frame for an accessory apparatus. When right and left quick mounting devices are used, they may be coaxially aligned and may be spaced apart from one another to as to allow for both quick mounting devices to engage a respective tailgate pivot member.

The left quick-mounting device 22 has a locking member 28 mounted to the mounting structure 24 for movement relative to the mounting structure 24 between a locking position for engaging the left tailgate pivot member 30 to hold the mounting structure 24 to the tailgate pivot member 30, and a release position for disengaging the tailgate pivot member 30 to allow removal of the mounting structure 24 from the tailgate pivot member 30.

Figure 3:
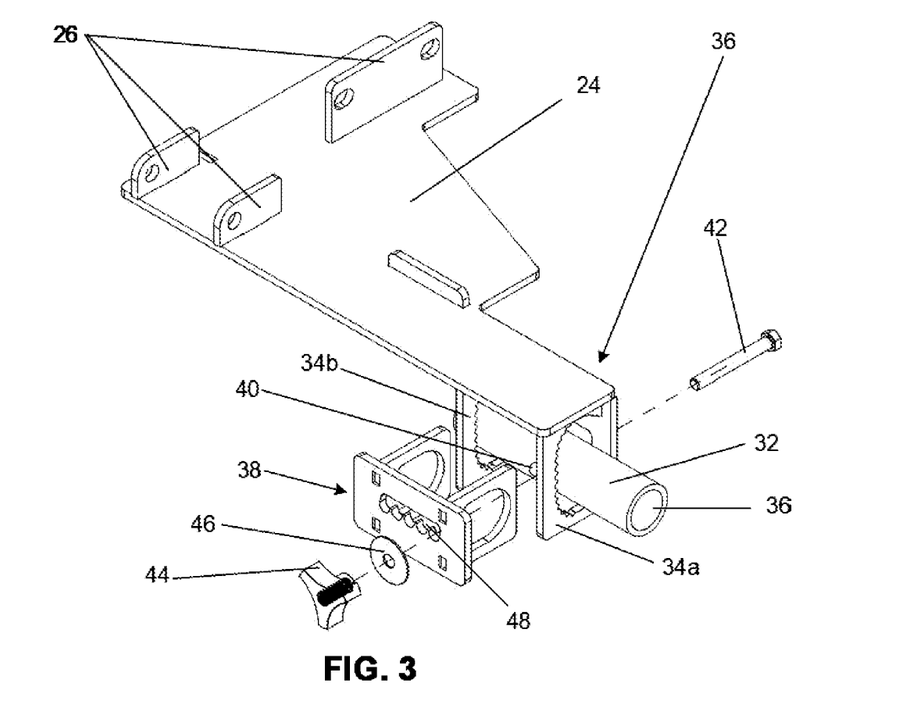
FIG. 3 is an exploded view of the mounting apparatus shown in FIG. 2.

Turning to FIG. 3, an exploded view of the exemplary right quick-mounting device 20 provides greater detail. Exemplary right quick mounting device 20 has a locking tube 32 mounted to the mounting structure 24 through brackets 34a and 34b, allowing for lateral extension and retraction of the locking tube 32. The locking tube 32 forms a socket 36 for receiving therein the respective tailgate pivot member when laterally extended. The locking tube 32 and its socket 36 may have a circular, square, or any other-shaped cross section. Further the cross-sectional shape of the locking tube 32 and socket 36 may be non-continuous over the length of the locking tube 32. When the locking tube 32 is laterally extended over a tailgate pivot member, the mounting structure 24 is secured to the cargo bay 14. The locking tube 32 may then be laterally retracted to allow removal of the mounting structure 24 from the cargo bay 14.

The locking tube 32 may further be laterally guided in a locking bracket 38 that is adjustably mounted to the mounting structure 24 for vertical adjustment with respect to the mounting structure 24. The locking tube 32 may have, in opposed side walls, aligned holes (e.g., hole 40) for receiving a locking pin, such as bolt 42, perpendicular to the axis of the locking tube 32. The locking pin 42 may be a pin with no head or threads, or may be bolt or a screw or the like.

The mounting structure 24 may further have a recess in which the locking bracket 38 is laterally restrained but movable vertically within the recess. The locking tube 32 and locking bracket 38 may be fixed against movement relative to the mounting structure 24 by tightening bolt 42. The bolt 42 may be threaded onto a handle, such as knob 44. One or more washers, such as washer 46, maybe placed around bolt 42 for increased fastening and protection of component surfaces.

The locking bracket 38 may have a plurality of detents 48 connected by a void. The void may be above or below the detents 48, but ideally below the detents 48 as pictured. The detents 48 are positioned to receive the bolt 42, placed through hole 40 of the locking tube 32. The bolt 42 may be moved from one detent to another, for example, by rotating the locking tube 32 upward to move the bolt out of a first detent and into the void. The locking tube 32 and attached bolt 42 are then moved laterally to position the bolt over a second detent. The locking tube 32 is then rotated back downward to position the bolt in the second detent.

Figure 4:
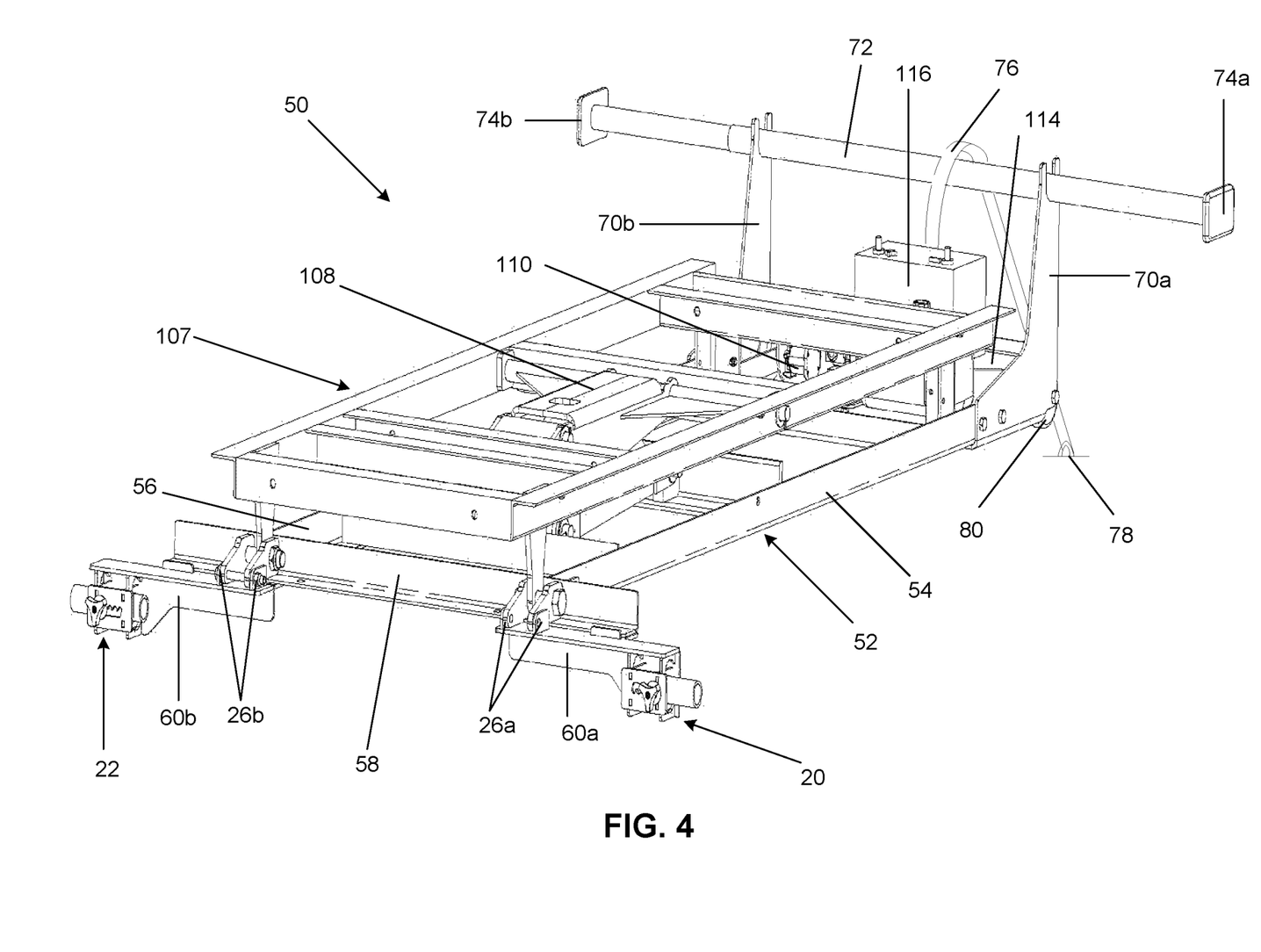
FIG. 4 is a perspective view of the frame assembly of the exemplary dump insert accessory shown in FIG. 1.

Turning now to FIG. 4, illustrated is an exemplary frame 50 for an accessory apparatus, in this example for dumping insert 10. The frame 50 has a lower support structure 52 that lies on the floor of the cargo bay 12. The lower support structure 52 has right and left rails 54 and 56 along the right and left sides, respectively. In this example, the lower support structure 52 also has a mounting bar 58 at its back end. The lower support structure 52 of frame 50 may have any number of cross-supports between the right and left rails 54 and 56.

The lower support structure 52 further has right and left quick-mounting devices 20 and 22. In exemplary frame 50 the quick mounting devices 20 and 22 are mounted to mounting bar 58 via mounting brackets 26. Mounting bar 58 may run the width of cargo bay 12 or be only long enough to mount the right and left quick-mounting devices 20 and 22. The mounting bar 58 may include a plate that extends downward below the bottom of the cargo bay 12 so as to prevent further forward motion of the dump insert 10 into the cargo bay 12. Additionally, the mounting structures 24 of the right and left quick-mounting devices 20 and 22 may include similar vertical plates 54 extending along each mounting structure 24 beyond the bottom edge of the cargo bay 12 to prevent forward movement of a mounted apparatus into the cargo bay 12.

Right and left brackets 70a and 70b, may be mounted, respectively to the right and left rails 54 and 56 of the lower support structure 52 at the front end of the frame 50. The brackets 70 extend upward from the lower support structure 52. A cross member is attached to, or supported by, the brackets 70.

The cross member may be a bar or any other structure between the brackets 70. In the illustrated embodiment, the cross member is telescoping bar 72. The telescoping bar 72 includes right and left friction pads 74a and 74b. When the telescoping bar 72 is laterally extended, the friction pads 74 place pressure upon the right and left walls 16 and 18 of the cargo bay 12. The pressure between the friction pads 74 and the walls 16 and 18 helps prevent lateral movement of the frame 50 within the cargo bay 12.

In one embodiment, at least one strap 76 is used to further secure the frame 50 to the cargo bay 12. Most pickup trucks include a pair of attachment points on the floor of the cargo bay near the front end, for example attachment point 78. An end of strap 76 is fasted to attachment point 78 and placed over the cross member, for example telescoping bar 72. The other end of the strap 76 is then fastened to the same attachment point 78 or another attachment point of cargo bay 12. The strap 76 may also be placed across the front end of the frame 50 so as to be nearly perpendicular to the floor of the cargo bay 12 and better restrain vertical motion.

It should be appreciated that any number of straps may be used to secure the front end of the frame 50. Further, the strap 76 may be fastened according to any number of different methods. For example, the strap 76 may be first placed over a cross member and then fastened to one or more attachment points. Alternatively, the strap 76 may be fastened to one attachment point, placed over a cross member, and then fastened to another or the same attachment point. Also, both ends of the strap 76 could be fastened to one or more attachment points first, with sufficient slack to slide the frame 50, including the upward extending brackets 70 and the cross member beneath, and then the strap 76 could be tightened after the frame 50 has been positioned beneath.

In another embodiment, the lower support structure 52 additionally includes at least one wheel, such as wheel 80, attached to a bottom portion of each of the right and left brackets 70a and 70b and/or the right and left rails 54 and 56. The wheels allow easy rolling of frame 50 and any mounted apparatus into and across the cargo bay 12 to position the frame 50 and apparatus in the cargo bay 12.

Figure 5:
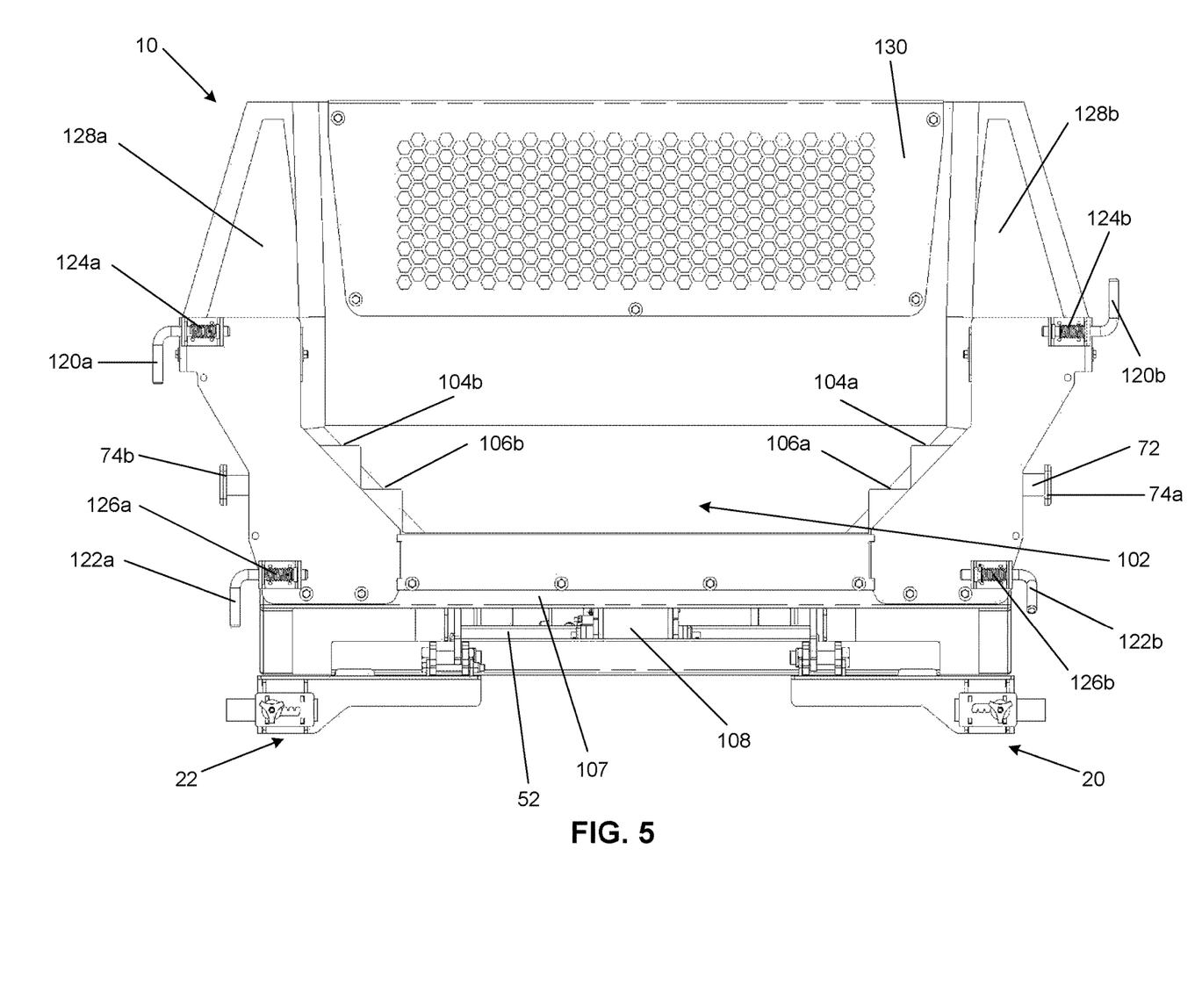
FIG. 5 is a rear perspective view of the dump insert accessory shown in FIG. 1 with the tailgate removed to show the inside of an exemplary dump body.

Turning to FIG. 5, in one embodiment, the accessory apparatus is a dumping insert 10 for fitting inside the cargo bay 12. The dumping insert 10 allows an ordinary pickup truck, like truck 14, to function as a dump truck. As will be explained, the dumping insert may pivot upward, allowing the contents of the dump insert to spill out from the cargo bay or to ease the removal of material from the cargo bay.

The dumping insert 10 includes a dump body 102 that serves as a reservoir for holding material within the dumping insert 10. The dump body 102 may extend upwardly above the right and left walls 16 and 18 of the cargo bay 12. The dump body 102 may further extend outwardly over the walls 16 and 18 so as to create a larger volume than the original cargo bay 12. Outward sloping walls also allow the dump body 102 to fit within cargo bays of varying widths, as the dump body 102 is narrow at its bottom than at its top. The dump body may be of any suitable length and so as to accommodate the cargo bay 12. For example, 8 feet and 6 feet are typical cargo bay lengths.

The dump body 102 may be made from any suitably durable material. For instance, the dump body 102 could be made from stainless steel formed to fit within cargo bay 12. The dump body 102 could also be formed from a non-stainless steel and coated, for example with a black-powder coat, to inhibit oxidation and other damage. The dump body 102 can also be made from a molded polymer material. The molded polymer material may be single-walled or may be double-walled so as to have an inner wall spaced from an outer wall.

The dump body 102 may include opposing stepped sidewalls forming horizontal support surfaces 104 and 106 at different elevations. The support surfaces 104a and 106a on one side may be at the same elevation as the respective support surfaces 104b and 106b on the opposite side. The lower support surfaces 106 may be laterally spaced closer together than higher support surfaces 104.

The support surfaces 104 and 106 may be optimally spaced so as to securely accommodate common building materials. For example, higher support surfaces 104 may be spaced 48 inches apart so as to securely accommodate a stack of standard-width plywood or drywall or a standard-size pallet. The lower support surfaces 106 could be spaced 42 inches apart to securely accommodate smaller common pallet sizes.

The dump body 102 is mounted to an upper support structure 107 of the frame 50. The upper support structure 107 may contain any number of right and left rails and cross supports. The dump body 102 may be mounted to the upper support structure 107 at one or more points using any suitable method of attachment. The upper support structure 107 is pivotally connected to the lower support structure 52 at the back end of the frame 50. Thus, the front end of the dump body 102 and upper support structure 107 can pivot upward with respect to the lower support structure 54 and cargo bay 12.

The upper support structure 107 may also be attached to a mechanical arm 108, the mechanical arm 108 being extendably attached to a middle portion of the lower support structure 52. Turning briefly back to FIG. 4, the mechanical arm 108 is illustrated in greater detail within the frame 50. When the mechanical arm is extended, a middle portion of the upper support structure 107 is pushed upward and away from the lower support structure 53 and the cargo bay 12, rotationally pivoting around the pivotal attachment between the upper support structure 107 and the lower support structure 52 at the back end of the frame 50. While a 45-degree angle with respect to the lower support structure 52 is sufficient for dumping material from the dump body 102, a greater angle may be possible. When the mechanical arm 108 is retracted, it folds back into a folded position as illustrated in FIG. 4, and the dump body 102 returns to a near horizontal position within the cargo bay 12.

The dumping insert 10 may further include a hydraulic drive system 110 for extending or retracting the mechanical arm 108. The hydraulic drive system may include, for example, a hydraulic motor and a hydraulic fluid tank. Any suitable motor, sufficient to hydraulically operate the arm 108 to lift a heavy payload may be used. For example, a 1.5 Kw motor, with a maximum 3 HP output, would likely be sufficient to raise the dump body 102 to an angle of 45 degrees under a 6,000 lb. payload. The hydraulic drive system 110 may include one or more switches located on the frame 50 or dump body 102 for operating the hydraulic drive system 110. The hydraulic drive system 110 may further include a tethered control box capable of being passed through the to the cab of truck 14 for easy access by a driver or operator. The hydraulic drive system 110 may be powered by, and wired into, the electrical system of the truck 14.

In one embodiment, the frame 50 also includes a housing 114 capable of holding a battery 116. The hydraulic drive system 110 may then be powered by the battery 116 housed in the housing 114 of the frame 50. Using the battery 116 instead of the power source of the truck 14 allows for even easier installation and removal of the dumping insert 10 because no wire connections are necessary between the dumping insert 10 and truck 14. The battery 116 may be a rechargeable battery and have characteristics necessary for operating the hydraulic drive system 110 several times under heavy payload before requiring recharge or replacement.

Figure 6:
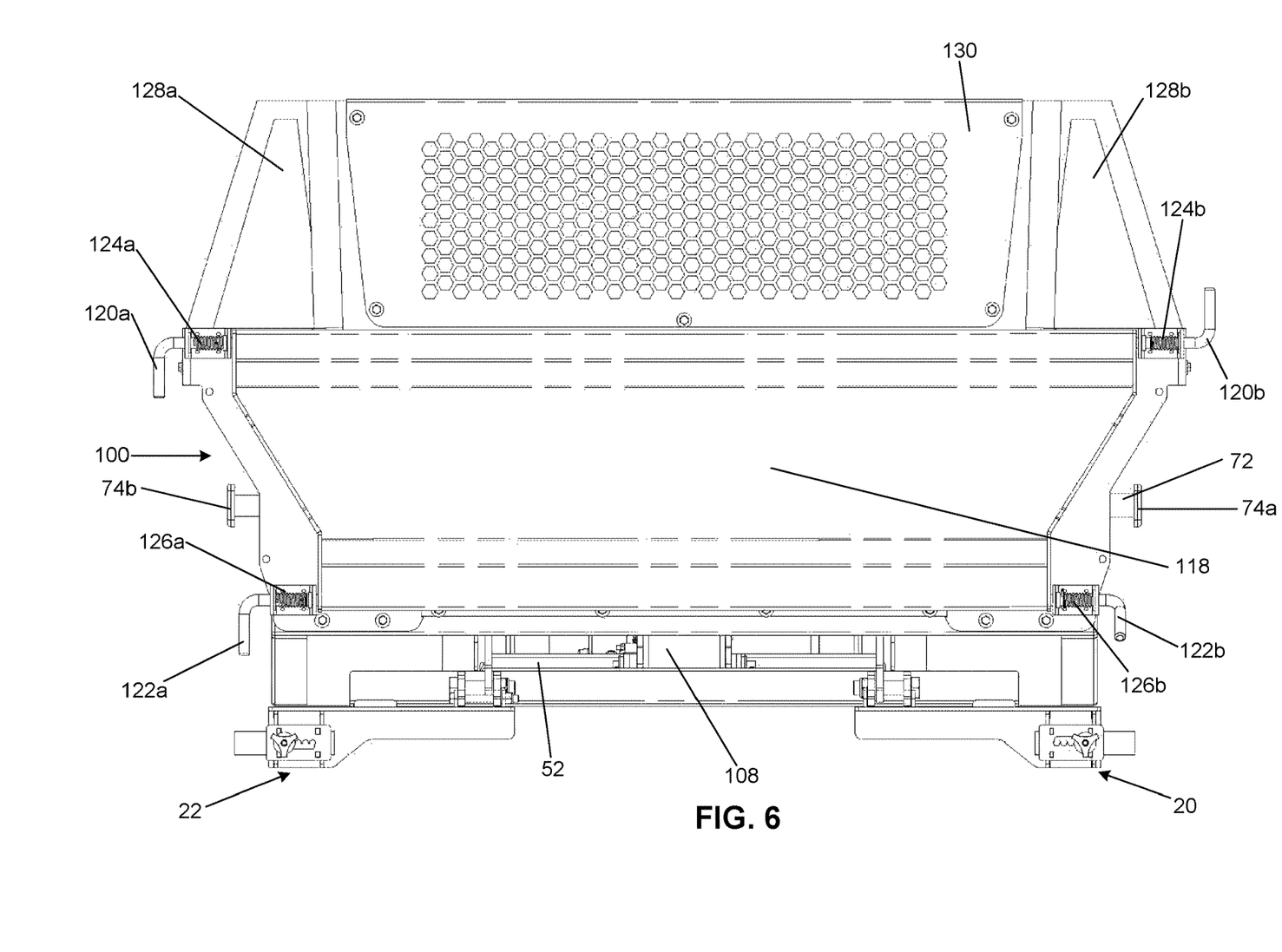
FIG. 6 is a rear perspective view of the dump insert accessory shown in FIG. 1 with the tailgate attached.

Turning now to FIG. 6, in one embodiment the dump body 102 also includes a detachable tailgate 118, substantially the same size and shape as the back of the dump body 102, and pivotally connectable both at top edges of a back end of the dump body 102 and at bottom edges of the back end of the dump body 102 between right and left sides of the dump body 102. In one exemplary embodiment, the tailgate 118 includes four attachment recesses, one in each of four corners, for inserting attachment pins. The back of dump body 102 includes four locking hinge pins 120a, 120b, 122a and 122b. The locking hinge pins 120 and 122 include handles for easy engaging. Each of the locking hinge pins 120 and 122 pass through a recess at a respective corner at the back of the dump body 102. Over each pin, and between the walls of each respective recess, are springs 124a, 124b, 126a and 126b that allow the pins to be pushed in and locked in an engaging position or pulled out into a releasing position.

The tailgate 118 can be attached to the dump body at any given attachment point by engaging a locking hinge pin 120 and 122 into respective recess in the tailgate. When all four locking hinge pins 120 and 122 are engaged, the tailgate 118 is closed and will hold material in the dump body 102. If only the top locking hinge pins 120 are engaged, then the tailgate 108 will pivot about the top edge of the back of the dump body 102. In this position, the tailgate 108 may remain substantially in a closed position while the dump body 102 is horizontally level, and then open gradually at the bottom back edge of the dump body 102 as the dump body 102 is tilted upward for dumping. If only the bottom locking hinge pins 122 are engaged, the tailgate 118 will pivot about the bottom edge of the back of the dump body 102, allowing full access to the back of the dump body 102 without fully removing the tailgate 118.

The height of the dump body 102 may be extended by mounting right and left wall extensions 128a and 128b to a top edge of left or right sides of the dump body 102. The top right and left edges of the dump body 102 may have premolded slots to accommodate the wall extensions 128. The wall extensions 128 may be mounted using one or more support brackets, on the inside and/or outside faces of the wall extensions 128, and running vertically down the face of the wall extension 128 and outward over the top edges of the dump body 102. The wall extensions 128 and/or dump body 102 my have predrilled holes for receiving screws for fastening the wall extensions 128 to the dump body 102. The wall extensions 128 may be made from any of the above described materials used for the dump body 102 and may be solid, double walled, and/or corrugated.

The dumping insert 10 may also include a rear window guard 130. The rear window guard 130 may be mountable to a top edge of a front section of the dump body 102 so as to extend upward from the front section of the dump body 102 when mounted. The rear window guard 130 may further include a plurality of holes that allow sight through the rear window guard 130. The rear window guard thus allows a driver of the truck 14 to see out a rear window of the cab while also protecting the rear window and cab from debris created by material in the dump body 102.

The top front edge of the dump body 102 may have a premolded slot to accommodate the rear window guard 130. The rear window guard 130 may be mounted using one or more support brackets, on the inside face of the rear window guard 130, and running vertically down the face of the rear window guard 130 and over the top edge of the dump body 102. The window guard 130 and/or dump body 102 may have predrilled holes for receiving screws for fastening the window guard 130 to the dump body 102. The window guard 130 may be made from any of the above described materials used for the dump body 102.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cargo bay accessory for inserting into a cargo bay of a truck, the cargo bay accessory comprising:

a floor;

opposing stepped side walls extending upright from the floor, each of the stepped side walls having a base portion proximal the floor and a top portion at an elevation above the floor, wherein each of the stepped side walls forms a series of horizontal support surfaces at different elevations between the base portion and the top portion, wherein the series of horizontal support surfaces of each of the stepped side walls includes at least a lower support surface and a higher support surface, the lower support surface being at an elevation above the base portion of the side wall, and the higher support surface being at an elevation above the lower support surface and below the top portion of the stepped side wall, wherein the respective lower support surfaces of the opposing stepped side walls are at the same elevation, and the respective higher support surfaces of the opposing stepped side walls are at the same elevation, and wherein the respective lower support surfaces of the opposing stepped side walls are laterally spaced closer together than the respective higher support surfaces of the opposing stepped side walls wherein the floor and opposing stepped sidewalls form at least a portion of a body of the cargo bay accessory, the cargo bay accessory further including a lower support structure fixably mountable in the cargo bay of the truck, and an upper support structure mounted to the body of the cargo bay accessory, and wherein the upper support structure is pivotably connected to the lower support structure at a pivot axis such that, when the cargo bay accessory is mounted in the cargo bay of the truck and in use, a pivoting upward of the upper support structure relative to the lower support structure about the pivot axis causes the body of the cargo bay accessory to pivot upwards relative to the cargo bay of the truck.

2. The cargo bay accessory of claim 1, wherein the cargo bay accessory is double-walled and has an inner wall spaced from an outer wall.

3. The cargo bay accessory of claim 1, the cargo bay accessory further comprising a detachable tailgate section, pivotally connectable both at top edges of a back end of the cargo bay accessory and at bottom edges of the back end of the cargo bay accessory between right and left sides of the cargo bay accessory.

4. A cargo bay accessory for inserting into a cargo bay of a truck, the cargo bay accessory comprising:
opposing stepped side walls, wherein each of the stepped side walls forms a series of horizontal support surfaces at different elevations,
wherein the series of horizontal support surfaces of each of the stepped side walls includes at least a lower support surface and a higher support surface, the higher support surface being at an elevation above the lower support surface,
wherein the respective lower support surfaces of the opposing stepped side walls are at the same elevation, and the respective higher support surfaces of the opposing stepped side walls are at the same elevation, and
wherein the respective lower support surfaces of the opposing stepped side walls are laterally spaced closer together than the respective higher support surfaces of the opposing stepped side walls,
the cargo bay accessory further comprising a detachable tailgate section, pivotally connectable both at top edges of a back end of the cargo bay accessory and at bottom edges of the back end of the cargo bay accessory between right and left sides of the cargo bay accessory, and
the cargo bay accessory further comprising wall extension sections mountable to a top edge of left or right sides of the cargo bay accessory and extending upward from the respective side of the cargo bay accessory when mounted.

5. A cargo bay accessory for inserting into a cargo bay of a truck, the cargo bay accessory comprising:
opposing stepped side walls, wherein each of the stepped side walls forms a series of horizontal support surfaces at different elevations,
wherein the series of horizontal support surfaces of each of the stepped side walls includes at least a lower support surface and a higher support surface, the higher support surface being at an elevation above the lower support surface,
wherein the respective lower support surfaces of the opposing stepped side walls are at the same elevation, and the respective higher support surfaces of the opposing stepped side walls are at the same elevation, and
wherein the respective lower support surfaces of the opposing stepped side walls are laterally spaced closer together than the respective higher support surfaces of the opposing stepped side walls,
the cargo bay accessory further comprising a rear window guard section, mountable to a top edge of a front section of the cargo bay accessory, the rear window guard section extending upward from the front section of the cargo bay accessory when mounted, wherein the rear window guard section comprises a plurality of holes for allowing sight through the rear window guard section.

6. A cargo bay accessory in combination with a cargo bay of a truck, the cargo bay accessory comprising:
a floor;
opposing stepped side walls extending upright from the floor, each of the stepped side walls having a base portion proximal the floor and a top portion at an elevation above the floor, wherein each of the stepped side walls forms a series of horizontal support surfaces at different elevations between the base portion and the top portion,
wherein the series of horizontal support surfaces of each of the stepped side walls includes at least a lower support surface and a higher support surface, the lower support surface being at an elevation above the base portion of the side wall, and the higher support surface being at an elevation above the lower support surface and below the top portion of the stepped side wall,
wherein the respective lower support surfaces of the opposing stepped side walls are at the same elevation, and the respective higher support surfaces of the opposing stepped side walls are at the same elevation,
wherein the respective lower support surfaces of the opposing stepped side walls are laterally spaced closer together than the respective higher support surfaces of the opposing stepped side walls,
wherein the cargo bay accessory is pivotable relative to the cargo bay of the truck when the cargo bay accessory is mounted within the cargo bay of the truck and in use, and
wherein a rear region of the cargo bay accessory has a pivot axis that is fixed in position relative to the cargo bay of the truck, and a front region of the cargo bay accessory is pivotable upwards relative to the rear region about the pivot axis.

7. The cargo bay accessory according to claim 1 in combination with the cargo bay of the truck, wherein the lower support structure is secured to the cargo bay of the truck.

8. The cargo bay accessory of claim 1, wherein the upper support structure is connected to an actuator that is extendable to pivot the upper support structure upwards relative to the lower support structure.

9. The cargo bay accessory of claim 8, wherein the actuator is a hydraulically-operable actuator.

10. A cargo bay accessory for inserting into a cargo bay of a truck, the cargo bay accessory comprising:
a floor;
opposing stepped side walls extending upright from the floor, each of the stepped side walls having a base portion proximal the floor and a top portion at an elevation above the floor, wherein each of the stepped side walls forms a series of horizontal support surfaces at different elevations between the base portion and the top portion,
wherein the series of horizontal support surfaces of each of the stepped side walls includes at least a lower support surface and a higher support surface, the lower support surface being at an elevation above the base portion of the side wall, and the higher support surface being at an elevation above the lower support surface and below the top portion of the stepped side wall,
wherein the respective lower support surfaces of the opposing stepped side walls are at the same elevation, and the respective higher support surfaces of the opposing stepped side walls are at the same elevation, and
wherein the respective lower support surfaces of the opposing stepped side walls are laterally spaced closer together than the respective higher support surfaces of the opposing stepped side walls, wherein the stepped sidewalls have upper extensions that are configured to extend laterally over corresponding walls of the cargo bay of the truck to increase the volume of the cargo bay accessory relative to the volume of the cargo bay of the truck.

\* \* \* \* \*